United States Patent [19]
Griggs et al.

[11] Patent Number: 5,798,399
[45] Date of Patent: Aug. 25, 1998

[54] CURING AGENT COMPOSITIONS AND A METHOD OF MAKING

[75] Inventors: Allen L. Griggs; Taun L. McKenzie, both of St. Paul, Minn.

[73] Assignee: Minnesota Mining and Manufacturing Company, St. Paul, Minn.

[21] Appl. No.: 924,044

[22] Filed: Aug. 28, 1997

Related U.S. Application Data

[62] Division of Ser. No. 572,729, Dec. 14, 1995, Pat. No. 5,717,011.

[51] Int. Cl.$^6$ .................................................. C08L 63/00
[52] U.S. Cl. ........................ 523/414; 525/504; 525/523; 525/526; 528/94
[58] Field of Search ............................. 523/414; 525/504, 525/523, 526; 528/94

[56] References Cited

U.S. PATENT DOCUMENTS

| | | | |
|---|---|---|---|
| 3,756,984 | 9/1973 | Klaren et al. | 260/47 EC |
| 4,446,257 | 5/1984 | Kooijmans et al. | 523/403 |
| 4,558,617 | 12/1985 | Oka | 427/443.1 |
| 5,007,355 | 4/1991 | Nagase et al. | 525/526 |
| 5,212,263 | 5/1993 | Schreffler | 525/533 |
| 5,357,008 | 10/1994 | Tsai et al. | 525/526 |
| 5,407,978 | 4/1995 | Bymark et al. | 523/457 |
| 5,465,910 | 11/1995 | Hall et al. | 239/585.4 |
| 5,554,714 | 9/1996 | Muroi et al. | 528/94 |

FOREIGN PATENT DOCUMENTS

| | | | |
|---|---|---|---|
| 0 157 410 | 10/1985 | European Pat. Off. | A61K 31/785 |
| 0 325 146 | 7/1989 | European Pat. Off. | C08G 59/06 |
| 0 496 163 | 7/1992 | European Pat. Off. | C08G 59/10 |
| 59-155421 | 9/1984 | Japan | C08G 59/14 |
| 61-111323 | 5/1986 | Japan | C08G 59/50 |
| 61-268721 | 11/1986 | Japan | C08G 59/50 |
| 4-31420 | 2/1992 | Japan | C08G 18/58 |
| 672 770 U | 11/1989 | Switzerland | C07D 233/60 |

*Primary Examiner*—Randy Gulakowski
*Attorney, Agent, or Firm*—Daniel C. Schulte

[57] ABSTRACT

The present invention provides a novel method for preparing a novel curing agent composition suitable for curing epoxy resin compositions. The present invention also provides the novel curing agent compositions.

8 Claims, No Drawings

5,798,399

1

CURING AGENT COMPOSITIONS AND A METHOD OF MAKING

This is a division of application Ser. No. 08/572,729 filed Dec. 14, 1995 now Pat. No. 5,717,011.

FIELD OF THE INVENTION

The present invention provides a novel method for preparing a novel curing agent composition suitable for curing epoxy resin compositions. The present invention also provides the novel curing agent compositions.

BACKGROUND OF THE INVENTION

The preparation of imidazole epoxy adducts and their use as latent epoxy curing agents and accelerators is described in U.S. Pat. No. 3,756,984, Klaren, et. al., assigned to Shell Oil Company. These adducts, when used in epoxy resin-curing agent mixtures, provide improved shelf life over previous commercial systems using amine curatives and simple imidazoles.

The earlier curing systems using amine curatives and simple imidazoles, while providing the rapid cure favored by commercial epoxy resin applicators, have the drawback of having shelf lives typically measuring in hours or days, or a few weeks at best. In those cases where the somewhat longer shelf lives are achieved, elevated curing temperatures are usually needed to provide the cure speeds desired.

One version of an imidazole adduct, which is marketed by Shell as Epicure™ P-101 and which is a solid at ambient shelf storage temperatures, has found utility in the formulation of functional epoxy powder coatings for corrosion protection of metal reinforcing bars. Examples of these powder coatings are described in European Patent Application EP 0325 146 A2 published on Jul. 26, 1989, Lampton, et. al., (Dow Chemical) and in U.S. Pat. No. 5,407,978, Bymark, et. al., assigned to 3M Company.

A need exists for additional curing agent compositions particularly those that can be prepared in large scale batch productions.

SUMMARY OF THE INVENTION

The present invention relates to novel methods for production of curing agent compositions comprising imidazole/ epoxy adduct(s) in the presence of water, which are excellent curing agents for epoxy resins. Furthermore, this invention relates to the synthesis of novel curing agent compositions comprising imidazole/epoxy adduct(s) by these methods. These novel curing agent compositions contain minor amounts of the reaction product of two epoxy groups from particular epoxy compounds with one imidazole compound to form internal quaternary imidazolium segment(s) which we believe to be stabilized by hydroxide ions from water. Additionally, mixtures of these novel imidazole/epoxy curing agent compositions with epoxy resins having more than one vicinal epoxy group per molecule, and optionally other curing agents (co-curing agent(s)) such as amines, phenolics, polycarboxylic acids and their anhydrides, etc., evidence a low rate of viscosity increase at temperatures below about 50 degrees C. and rapid cure to a thermoset condition at elevated temperatures.

We have discovered a novel method for large scale batch production of novel curing agent compositions comprising imidazole epoxy adduct(s). This method permits one to control the vigorous reaction exotherms, improve the homogeneity of the reaction mixture, and moderate the high

2 process viscosities encountered during the synthesis of novel curing agent compositions comprising imidazole epoxy adduct(s). Furthermore, the novel curing agent compositions which are products of this novel inventive method exhibit elevated temperature reactivities towards epoxy resins which are comparable to that of the commercially available Shell Epicure™ P-101 epoxy resin curing agent. Still further, the novel curing agent compositions of this invention evidence decreased room temperature curing agent reactivity in epoxy resin compared to Shell Epicure™ P-101. Analytical characterizations of the novel compositions of this invention show that compared to Shell Epicure™ P-101, a different reaction product composition is produced. Shell Epicure™ P-101 and Shell Epicure™ P-100, have been characterized to be compositions which are predominantly 2-methylimidazole adducts with diglycidyl ether of bisphenol A.

The curing agent compositions of this invention are suitably used as curing agents for epoxy resin compositions. More suitably, the curing agent compositions of this invention are used in epoxy resin curing compositions which are cured at elevated temperatures. These curing agent compositions may be used alone or in combination with co-curing agent(s). Preferably the curing agent compositions of the invention are used in combination with co-curing agent(s). The curing agent compositions of this invention which are solids at room temperature are particularly suitable for use as curing agents in epoxy powder coatings, aqueous form or the dried form. Those dried forms which are solids at room temperature are preferably pulverized to a powder before use.

The curing agent compositions of the invention may be used in various epoxy resin curable compositions including, for example, powder coatings, aqueous coatings, two component potting resins and adhesives, and one component curable compositions such as hot melt adhesives and mastics.

The present invention provides a single step method of preparing a curing agent composition(s) comprising the steps of:

(a) providing a mixture having a temperature range of about 15 to about 50 degrees C., the mixture consisting essentially of:
  (i) an epoxy compound(s) having an average of at least one vicinal epoxy group per molecule and an epoxy equivalent weight of less than about 350, wherein if the epoxy compound(s) is water insoluble it must have a ball and ring softening point of about 40 degrees C. or less;
  (ii) an imidazole compound(s) selected from the group consisting of

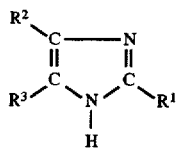

wherein
  $R^1$ is independently selected from the group consisting of hydrogen, aryl radicals, alkyl radicals comprising up to about 18 carbon atoms, and cycloalkyl radicals comprising up to about 18 carbon atoms;
  $R^2$ is independently selected from the group consisting of hydrogen, aryl radicals, alkyl radicals comprising up to about 18 carbon atoms, and cycloalkyl radicals comprising up to about 18 carbon atoms;

R³ is independently selected from the group consisting of hydrogen, aryl radicals, alkyl radicals comprising up to about 18 carbon atoms, and cycloalkyl radicals comprising up to about 18 carbon atoms;

wherein R² and R³ may alternatively together form a fused ring structure; and (iii) at least about 5 percent by weight water based on the total weight of components of elements (i) plus (ii) plus (iii);

(b) agitating the mixture and allowing the mixture to react while heating the mixture, if necessary, such that the temperature of the mixture reaches a temperature range of about 120 to about 160 degrees C. in order to form a curing agent composition;

wherein the total amount of epoxy compound(s) and imidazole compound(s) used according to the method is such that about 0.55 to about 1.3 equivalents of secondary amino group of the imidazole compound(s) per equivalent of epoxy group are used.

R² and R³ may alternatively together form a fused ring structure selected from the group consisting of fused aromatic ring structures, fused heterocyclic ring structures, and fused alicyclic ring structures.

The present invention also provides the curing agent composition made according to the single step method.

Preferably the amount of water used according to the method ranges from about 14 to about 25 percent by weight based upon the total weight of components of elements (i) plus (ii) plus (iii).

Preferably the epoxy compound has an equivalent weight of about 160 to about 210.

The present invention also provides a curable composition comprising:

(a) the above described curing agent composition;

(b) an epoxy compound(s) having an average of greater than 1 vicinal epoxy group per molecule; and (c) an optional epoxy co-curing agent(s);

wherein about 0.1 to about 20 weight percent of the curing agent composition of (a) is present based on the total weight of the curable composition.

The present invention also provides the above described curable composition which has been cured.

The present invention also provides a multiple step method of preparing a curing agent composition comprising the steps of:

(a) providing a mixture having a temperature range of about 15 to about 50 degrees C., the mixture consisting essentially of:

(i) a first charge of an epoxy compound(s) having an average of at least one vicinal epoxy group per molecule and an epoxy equivalent weight of less than about 350, wherein if the epoxy compound(s) is water insoluble it must have a ball and ring softening point of about 40 degrees C. or less;

(ii) an imidazole compound(s) selected from the group consisting of

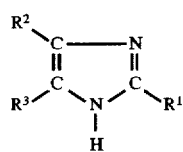

wherein

R¹ is independently selected from the group consisting of hydrogen, aryl radicals, alkyl radicals comprising up to about 18 carbon atoms, and cycloalkyl radicals comprising up to about 18 carbon atoms;

R² is independently selected from the group consisting of hydrogen, aryl radicals, alkyl radicals comprising up to about 18 carbon atoms, and cycloalkyl radicals comprising up to about 18 carbon atoms;

R³ is independently selected from the group consisting of hydrogen, aryl radicals, alkyl radicals comprising up to about 18 carbon atoms, and cycloalkyl radicals comprising up to about 18 carbon atoms;

wherein R² and R³ may alternatively together form a fused ring structure;

(iii) at least about 5 percent by weight water based on the total weight of components of elements (i) plus (ii) plus (iii);

(b) agitating the mixture and allowing the mixture to react wherein optionally the mixture is heated to accelerate the reaction wherein the amount of heat optionally added in step (b) and the epoxy compound added in step (a) is such that the mixture temperature during reaction does not exceed about 110 degrees C., wherein sufficient water is added in step (a) such that at least about 5 percent by weight water is present based upon the total weight of the mixture during step (b);

(c) optionally adding to the mixture an additional charge of an epoxy compound(s) having at least one vicinal epoxy group per molecule and an epoxy equivalent weight of less than about 350, wherein if the epoxy compound(s) is water insoluble it must have a ball and ring softening point of about 40 degrees C. or less, after cooling the mixture, if necessary, to achieve a temperature range of about 15 to about 50 degrees C. and allowing the mixture to react wherein optionally the mixture is heated to accelerate the reaction, wherein the amount of epoxy compound(s) added in step (c) and the amount of heat optionally added in step (c) is such that the temperature of the mixture of step (c) does not exceed about 110 degrees C., and wherein agitation is maintained throughout step (c);

(d) optionally repeating step (c) one or more times;

(e) continuing agitation of the mixture and cooling, if necessary, to obtain a temperature range of the mixture of about 15 to about 50 degrees C. and adding a final charge of an epoxy compound(s) having at least one vicinal epoxy group per molecule and an epoxy equivalent weight of less than about 350, wherein if the epoxy compound(s) is water insoluble it must have a ball and ring softening point of about 40 degrees C. or less; and (f) heating the mixture to a temperature range of about 120 degrees C. to about 160 degrees C. to cause the mixture to further react and to remove water and form the curing agent composition;

wherein the total amount of epoxy compound(s) and imidazole compound(s) used according to the method is such that about 0.55 to about 1.3 equivalents of secondary amine group of the imidazole compound(s) per equivalents of epoxy group are used;

wherein water is added to the mixture, if necessary, in one or more of the following steps:(c), (d), (e) in order that at least about 5 percent by weight water is present based upon the total weight of the mixture during optional step (c), if included, optional step (d), if included, and step (e).

$R^2$ and $R^3$ may alternatively together form a fused ring structure selected from the group consisting of fused aromatic ring structures, fused heterocyclic ring structures, and fused alicyclic ring structures.

The present invention also provides the curing agent composition made according to the above multiple step method.

Preferably the amount of water in the above method ranges from about 14 to about 25 percent by weight based upon the total weight of the mixture throughout step (a), step (b), optional step (c), optional step (d), and step (e) of the method.

Preferably the epoxy compound has an equivalent weight of about 160 to about 210.

The present invention also provides a curable composition comprising:

(a) the above described curing agent composition;
(b) an epoxy compound(s) having an average of greater than 1 vicinal epoxy group per molecule; and
(c) an optional epoxy co-curing agent(s);

wherein about 0.1 to about 20 weight percent of the curing agent composition of (a) is present based on the total weight of the curable composition.

The present invention also provides the above described curable composition prepared according to the multiple step method which has been cured.

DETAILED DESCRIPTION OF THE INVENTION

Epoxy Compounds for Curing Agent Compositions

Suitable epoxy compounds have an average of at least one vicinal epoxy group per molecule and an epoxy equivalent weight of less than about 350, wherein if the epoxy compound(s) is water insoluble, it must have a ball and ring softening point of about 40 degrees C. (refer to ASTM E28-67) or less. Polyglycidyl ethers of polyhydric phenols are preferably used. Typical examples of polyglycidyl ethers of a polyhydric phenols are diglycidyl ether of bisphenol A such as Epon™ 828 marketed by Shell Chemical, and diglycidyl ether of bisphenol F such as Eponm™ 862, also marketed by Shell Chemical. Another example would be polyglycidyl ethers of substituted and unsubstituted phenolic novolac compounds such as Ciba Geigy ECN 1235. Examples of other epoxy resins include glycidylated amino alcohol compounds and aminophenol compounds such as MY 0510 from Ciba Geigy, hydantoin diepoxides such as XU 238 from Ciba Geigy, mono- and polyglycidyl ethers of aliphatic mono- and polyhydric compounds such as butyl glycidyl ether and DER 732 from Dow Chemical, and mono- and polyglycidyl esters of mono- and polycarboxylic acids, for example Cardura E from Shell Chemical. Still other examples of suitable epoxy resins include various cyclohexene oxide-containing molecules such as ERL 4221 from Union Carbide and epoxies derived from reaction of peracetic acid with olefinic compounds.

Imidazole Compounds

Imidazole compounds suitable for the preparation of the curing agent compositions of the invention contain a secondary amino group in the imidazole ring. Suitable candidates can be represented by the formula:

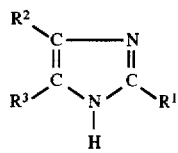

wherein R1 is independently selected from the group consisting of hydrogen, aryl radicals, alkyl radicals comprising up to about 18 carbon atoms, and cycloalkyl radical comprising up to about 18 carbon atoms;

R2 is independently selected from the group consisting of hydrogen, aryl radicals, alkyl radicals comprising up to about 18 carbon atoms, and cycloalkyl radical comprising up to about 18 carbon atoms;

R3 is independently selected from the group consisting of hydrogen, aryl radicals, alkyl radicals comprising up to about 18 carbon atoms, and cyrloalkyl radical comprising up to about 18 carbon atoms; wherein R2 and R3 may alternatively together form a fused ring structure.

Representative examples of suitable imidazole compounds falling within the above formula include imidazole, 2-methylimidazole, 4-methylimidazole, 5-methylimidazole, 2-heptadecylimidazole, 2-phenylimidazole, 2,4-dimethylimidazole, 2-ethyl-4-methylimidazole, 4-butyl-5-ethylimidazole, 2-cyclohexyl-4-methylimidazole, 2-ethyl-4-phenylimidazole, benzimidazole, and mixtures thereof.

Other suitable imidazoles falling within the above formula suitable for making the curing agent compositions are benzimidazoles of the formula

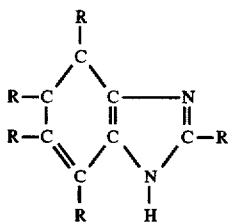

wherein each R independently denotes a halogen atom, a hydrocarbon radical, such as, preferably an alkyl or cycloaliphatic radical of up to about 12 carbon atoms or aryl radicals such as phenyl, tolyl, xylyl, etc., or more preferably a hydrogen atom.

Water

Water is an essential component of the invention in that it facilitates the reaction of two epoxy groups with one imidazole compound to form internal quaternary imidazolium segment(s). Deionized water is most preferred according to the method of the invention. Softened water is less preferred. Tap water is acceptable. The most preferred amount of water is about 14 to 25% based on the total weight of the mixture. Acceptable amounts of water include a minimum of at least 5% in the mixture up to virtually any practical maximum. The use of a huge excess of water becomes economically unfeasible but is otherwise a workable embodiment of this invention.

Process Equipment

Suitable batch reactor vessels include, for example, any glass, glass coated, or metal vessels equipped with agitator devices which are capable of stirring fluid mixtures having viscosities ranging up to about 2000 poise, and are capable of being heated and cooled. A preferred batch reactor is a vented vessel fabricated of stainless steel and having a stainless steel turbine agitator, a jacket for circulating heating and cooling fluids and vapors, a vacuum source capable of reducing the internal reactor pressure to 0.1 bar (76 mm Hg) or lower, an overhead condenser and decanter, vent, a pressure relief device, charging and draining ports, a nitrogen source for inerting and pressurizing the reactor as desired, and suitable controls for measuring, adjusting, and controlling batch temperature, internal pressure, and agitation.

Process Parameters

To maximize the formation of the desired curing agent composition(s) and minimize the unwanted epoxy homopolymerization reaction, typically the prereaction mixture is prepared wherein the water is charged first, then the imidazole(s) is slurried into the water. Lastly, the epoxy component is added as rapidly as possible with strong agitation. In this manner, the desired reaction products are maximized.

The prereaction mixture is provided at a temperature range of about 15 to about 50 degrees C. Temperatures below about 15 degrees C. lead to increased viscosity and decreased miscibility of the reactants and difficulty in achieving suitable prereaction mixtures. Temperatures above 50 degrees C. during formation of the prereaction mixture and during subsequent optional or non-optional epoxy compound(s) charging steps lead to excessive homopolymer formation. Temperatures above 110 degrees C. during curing agent composition formation in the multiple step reactions prior to the final step lead to decreased miscibility of the reaction mixture components and deleteriously affects the reaction product quality. Final processing in the one step and multiple step processes at 120 degrees C. to 160 degrees C. removes the water resulting in a product which is light amber to dark red in color. Temperatures above 160° C. lead to excessive sublimation loss of the imidazole component, and reduced reaction product quality.

Inerting a vented reaction vessel with nitrogen gas throughout the process is the preferred procedure. Air may interfere slightly with amine reactivity and does not inert the reaction environment, but otherwise is an acceptable atmosphere. Atmospheric pressure inside the reactor is typically maintained except when vacuum is optionally pulled to facilitate water removal.

The use of imidazole secondary amine to epoxy equivalents ratios below 0.55 causes excessive epoxy homopolymerization which causes high viscosity or gellation of the adduct(s). The use of secondary amine to epoxy equivalents ratios above 1.3 results in increased curing activity at temperatures below about 50 degrees C. with resultant reductions in storage life of the curable compositions.

Curable Compositions

Curable compositions may be prepared using the curing agent composition(s) of the invention. These curable compositions have a variety of uses. Suitable curable composition(s) comprise:

(a) the curing agent composition of the invention;

(b) an epoxy compound(s) having an average of greater than 1 vicinal epoxy group per molecule; and (c) an optional epoxy co-curing agent(s);

wherein about 0.1 to about 20 weight percent of the curing agent composition of (a) is present based on the total weight of the curable composition

CO-CURING AGENTS

Co-curing agents are epoxy curing agents which can be used in conjunction with the curing agent composition(s) of the invention to facilitate the cure of epoxy resins. The curing agent compositions of the invention comprising imidazole adduct(s) can be used in combination with co-curing agent(s) such as phenolic compounds, mercaptans, polycarboxylic acids and their anhydrides, amino compounds, amine salts, and quaternary ammonium salts. Examples of suitable amines that can be used in combination with the curing agent compositions are aliphatic monoamines such as dimethylethanol amine, methyldiethanol amine, morpholine, stearyldimethyl amine, tri-n-hexylamine; aliphatic polyfunctional amino compounds such as ethylene diamine, diethylenetriamine, N,N-dimethyl aminopropylamine, dicyandiamide, guanidine, and amidines; cycloaliphatic amines such as di(4-aminocyclohexyl)methane, di(3-methyl-4-aminocyclohexyl)methane, and 1-amino-e-aminomethyl-3, 5,5-trimethyl cyclohexane (isophorone diamine); aromatic amines such as p,p'-bis-(aminophenyl)methane, p,p'-bis (aminophenyl)sulphone, m-phenylenediamine, and heterocyclic amino compounds such as melamine. Polycarboxylic acid anhydrides that can be used as co-curing agent(s) are: phthalic anhydride, tetrahydrophthalic, anhydride, hexahydrophthalic anhydride, bicyclo-2,2, 1 -heptene-2,3 -dicarboxylic anhydride, methyl bicyclo-2,2,1-heptene-2,3-dicarboxylic anhydride isomers, 1,4,5,6,7,7-hexachlorobicyclo 2,2,1-5-heptene-2-3-dicarboxylic anhydride, succinic anhydride, alkenyl succinic anhydrides, pyromellitic dianhydride, 3,3',4,4'-benzophenone tetracarboxylic dianhydride, trimellitic anhydride and partial esters thereof with ethylene glycol and glycerol. Mixtures of two or more polycarboxylic anhydrides may also be used. Suitable phenolic compounds include, for example, bisphenols such as, bisphenol A and phenolic/epoxy adducts such as DEH87 marketed by Dow Chemical. Other phenolic compounds include novolak compounds such as Durite™ SD 1701 phenolic novolak.

The above-noted co-curing agents are generally employed in amounts varying according to the nature and the equivalent weights of co-curing agent and epoxy resins. Polycarboxylic acid anhydrides are preferably used in a ratio higher than 0.8, usually between 1.0 and 2.3, acid equivalents per epoxide equivalent. Amino compounds having more than one hydrogen atom attached to nitrogen are preferably used in a ratio from 0.8 to 1.2 active hydrogen equivalents per epoxide equivalent.

Mercaptans useful as co-curing agents are preferably liquid polymercaptopolysulphides such as compounds having the general structure

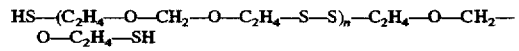

having number average molecular weights of 500 to 1000; such mercaptans are preferably used in amounts of 25 to 100 parts by weight per 100 parts by weight of epoxy resin.

Epoxy Compounds for Curable Compositions

Epoxy compounds useful in the coating compositions of the invention are those which have an average of greater than one vicinal epoxy group per molecule (i.e. polyglycidyl compounds). They may be used singly or in a mixture of two or more. The epoxy compounds may be water soluble or water insoluble. Polyglycidyl ethers of polyhydric phenols are preferably used. Typical examples of polyglycidyl ethers of a polyhydric phenols are diglycidyl ether of bisphenol A such as Epon™ 828 and Epon™ 2004 marketed by Shell Chemical, and diglycidyl ether of bisphenol F such as Epon™ 862, also marketed by Shell Chemical. Another example would be polyglycidyl ethers of substituted and unsubstituted phenolic novolac compounds such as Ciba Geigy ECN 1235. Examples of other epoxy resins include glycidylated amino alcohol compounds and aminophenol compounds such as MY 0510 from Ciba Geigy, hydantoin diepoxides such as XU 238 from Ciba Geigy, polyglycidyl ethers of aliphatic polyhydric compounds such as DER 732 from Dow Chemical, and polyglycidyl esters of polycarboxylic acids, for example Cardura E and Epon™ 871 from Shell Chemical. Still other examples of suitable epoxy resins include various cyclohexene oxide-containing molecules such as ERL 4221 from Union Carbide and epoxies derived from reaction of peracetic acid with olefinic compounds.

The following abbreviations are used herein:

equiv.=equivalent comp.=comparative ex.=example sec.=seconds rpm.=revolutions per minute

EXAMPLES

The following examples further illustrate but do not limit the present invention. All parts, percentages, ratios, etc., in the examples and elsewhere herein are by weight unless specified otherwise.

Ring and Ball Softening Point

The ring and ball softening point of a material is determined according to ASTM test method E28-67, incorporated by reference herein. The softening point is defined as the temperature at which a disk of the sample held within a horizontal ring is forced downward a distance of 2.54 cm under the weight of a steel ball as the sample is heated at a prescribed rate in a water or glycerin bath.

In a typical determination, a 25-50 g sample of material is heated above its melting point and poured into a preheated brass ring (1.9 cm outside diameter x 1.6 cm inside diameter) until the ring is completely full. The resin filled ring is allowed to cool until the sample solidifies, then is positioned 2.54 cm above a receiving plate in a stirred ethylene glycol bath which also contains an ASTM High Softening Point Thermometer. A 9.5 mm diameter steel ball weighing between 3.45 and 3.55 g is placed on the sample in the ring, and the ethylene glycol bath is heated at a rate of not more than 5° C. per minute. The softening point is determined as the temperature at which the sample touches the receiving plate.

EXAMPLE 1
Multistep Preparation of a Curing Agent

To a jacketed 15000 litre stainless steel reactor equipped with a stainless steel turbine agitator, a vacuum source, and an overhead water cooled condenser with a decanter, was charged 1667 kg of deionized water. The agitator was started and adjusted to 80 RPM which was maintained throughout the entire run, except during sampling. 3112 kg 97+% pure 2-methylimidazole from BASF was charged. The batch temperature was adjusted to 34° C. and 2102 kg of Shell Epon™ 828 liquid epoxy resin (preheated to 54° C.) was charged over 18 minutes. The batch temperature rose to 37° C. against maximum cooling during the charging of the epoxy resin. The reactor was closed and the batch exothermed to a peak temperature of 97° C. in six minutes. The batch was cooled to 29° C. and a second 2102 kg charge of Epon™ 828 epoxy (preheated to 54° C.) was added in 18 minutes. The batch temperature rose to 42° C. against maximum cooling during this second charge. The reactor was closed and the batch exothermed to a peak temperature of 88° C. The batch was cooled to 32° C. and a third 2102 kg charge of Epon™ 828 epoxy (preheated to 54° C.) was added in 14 minutes. The batch temperature rose to 34° C. against maximum cooling during this third charge. The reactor was closed and the batch exothermed to a peak temperature of 68° C. The batch was sampled for appearance and was observed to be a viscous, off-white, homogeneous liquid. The reactor was closed and the batch was heated to commence water removal. At a batch temperature of 110° C., boiling was vigorous. Several decanters of water were removed, during which time the batch temperature rose gradually to 130° C. At 130° C., vacuum was pulled to 30 mm Hg to remove the remaining water from the batch. Heating was continued under vacuum until the batch temperature reached 160° C. The batch was sampled for appearance and viscosity, and draining was commenced. The sample was observed to be dark red in appearance. The viscosity at 120° C. was measured at 36800 cps as using a Brookfield model RVTD digital viscometer equipped with a Thermosel™ unit and a #27 spindle at 10 rpm.

EXAMPLE 2
Single Step Preparation of a Curing Agent 100 grams Shell Epon™ 828, 87.8 grams 2-phenylimidazole, and 300 grams deionized water were mixed in a 1000 ml flask equipped with a thermometer. Using a hot plate, the mixture was heated to 70° C. where a reaction occurred which caused an exotherm that peaked at 102° C. Excess water was drained off and the reaction mixture was heated to 150° C. The reaction mixture was poured into an aluminum tray for cooling. The product was a solid at 25° C.

C-13 NMR Spectroscopy

Samples of Example 1 were dissolved in DMSO-d6 with Cr(AcAc)$_3$ and analyzed by quantitative C-13 NMR spectroscopy. A comparison was made using Shell Epicure™ P-100. Results are reported in Table I below as percent of epoxy equivalents reacted to form internal quaternary imidazolium segment(s);

TABLE I

| C-13 NMR Analysis for Quaternary Imidazolium Content | |
|---|---|
| Sample | % Epoxy Equiv. |
| Epicure ™ P-100 | 0.0 |
| Example 1 | 9.0 |

EXAMPLES 3-6 AND COMPARATIVE EXAMPLES 1 AND 2
Gel Time Measurement

A sample of curing agent, with and without dicyandiamide co-curing agent, was added to Shell Epon™ 2004 epoxy, ground into a powder composition, spread, and gently stirred with a spatula on a heated planar surface maintained at 240° C. Initially the powder sample melts and coalesces. Within a few seconds the molten resin began to cure to a thermoset condition. The gel time was recorded at the point where the composition solidified. A comparative example was prepared using Shell Epicure™ P-101 as the curing agent. Table II below shows the parts by weight of each epoxy resin and the amount of co-curing agent used in each formulation. Also reported is the gel time for each formulation.

TABLE II

Gel Times

| Example | Epon™ 2004 | Epicure™ P-101 | Ex. 1 | Ex. 2 | Dicyandi-amide | Gel Time (sec) |
|---|---|---|---|---|---|---|
| Comp. Ex. 1 | 98 | 2 | | | | 44.6 |
| Ex. 3 | 98 | | 2 | | | 28.7 |
| Ex. 4 | 98 | | | 2 | | 68.7 |
| Comp. Ex. 2 | 96 | 2 | | | 2 | 6.9 |
| Ex. 5 | 96 | | 2 | | 2 | 8.0 |
| Ex. 6 | 96 | | | 2 | 2 | 11.6 |

EXAMPLES 7–8 AND COMPARATIVE EXAMPLE 3

Rate of Viscosity Increase

A sample of curing agent of the invention was added to Shell Epon™ 834 epoxy and placed in a Brookfield, model RVTD, Digital Viscometer equipped with a Thermosel™ unit set at 40° C. and 1 rpm using a #27 spindle. A comparative example was prepared by using Shell Epicure™ P-100 as the curing agent. Table III below shows the parts by weight of each epoxy resin and the amount of curing agent used in each formulation. Also reported is the rate of viscosity increase for each formulation as determined by the following equation;

Rate of viscosity increase=(Final viscosity–Initial viscosity)÷(Time)

TABLE III

Rate of Viscosity Increase

| Example | Epon™ 834 | Epicure™ P-100 | Ex. 1 | Ex. 2 | Viscosity Increase (cps/hr) |
|---|---|---|---|---|---|
| Comp. Ex. 3 | 98 | 2 | | | 11900 |
| Ex. 7 | 98 | | 2 | | 5250 |
| Ex. 8 | 98 | | | 2 | 3140 |

The results from the preceding examples demonstrate a method(s) for preparing novel epoxy curing agent compositions. The novel curing agent(s) of the invention facilitate the cure of epoxy resins at appropriate curing temperatures yet are relatively inactive at lower temperatures as demonstrated by the reduced rate of viscosity increase at 40° C.

While this invention has been described in connection with specific embodiments, it should be understood that it is capable of further modification. The claims herein are intended to cover those variations which one skilled in the art would recognize as the equivalent of that which has been described herein.

It is claimed:

1. A curable composition comprising:
   (a) a curing agent composition prepared according to a method comprising the steps of:
      (A) providing a mixture having a temperature range of about 15 to about 50 degrees C., the mixture consisting essentially of:
         (i) an epoxy compound(s) having an average of at least one vicinal epoxy group per molecule and an epoxy equivalent weight of less than about 350, wherein if the epoxy compound is water insoluble it must have a ball and ring softening point of about 40 degrees C. or less;
         (ii) an imidazole compound(s) selected from the group consisting of

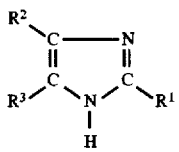

wherein
      $R^1$ is independently selected from the group consisting of hydrogen, aryl radicals, alkyl radicals comprising up to about 18 carbon atoms, and cycloalkyl radicals comprising up to about 18 carbon atoms;
      $R^2$ is independently selected from the group consisting of hydrogen, aryl radicals, alkyl radicals comprising up to about 18 carbon atoms, and cycloalkyl radicals comprising up to about 18 carbon atoms;
      $R^3$ is independently selected from the group consisting of hydrogen, aryl radicals, alkyl radicals comprising up to about 18 carbon atoms, and cycloalkyl radicals comprising up to about 18 carbon atoms;
      wherein $R^2$ and $R^3$ may alternatively together form a fused ring structure; and
         (iii) at least about 5 percent by weight water based on the total weight of components of elements (i) plus (ii) plus (iii);
      (B) agitating the mixture and allowing the mixture to react while heating the mixture, if necessary, such that the temperature of the mixture reaches a temperature range of about 120 to about 160 degrees C. in order to form a curing agent composition;
   wherein the total amount of epoxy compound(s) and imidazole compound(s) used according to the method is such that about 0.55 to about 1.3 equivalents of secondary amino group of the imidazole compound(s) per equivalent of epoxy group are used;
   (b) an epoxy compound(s) having an average of greater than 1 vicinal epoxy group per molecule; and
   (c) an optional epoxy co-curing agent(s);
wherein about 0.1 to about 20 weight percent of the curing agent composition of (a) is present based on the total weight of the curable composition.

2. The curable composition of claim 1 wherein the epoxy compound is selected from the group consisting of polyglycidyl ethers of a polyhydric phenols are diglycidyl ether of bisphenol A, polyglycidyl ethers of phenolic novolac compounds, glycidylated amino alcohol compounds, triglycidyl isocyanuric acid, hydantoin diepoxides, polyglycidyl ethers of aliphatic polyhydric compounds, polyglycidyl esters of polycarboxylic acids, cyclohexene oxide-containing molecules, and epoxies derived from reaction of peracetic acid with olefinic compounds.

3. The curable composition of claim 1 wherein the epoxy co-curing agent is selected from the group consisting of phenolic compounds, mercaptans, polycarboxylic acids and their anhydrides, amino compounds, amine salts, and quaternary ammonium salts.

4. The cured composition of claim 1.

5. A curable composition comprising:

(a) a curing agent composition prepared according to a method comprising the steps of:

(A) providing a mixture having a temperature range of about 15 to about 50 degrees C., the mixture consisting essentially of:

(i) a first charge of an epoxy compound(s) having an average of at least one vicinal epoxy group per molecule and an epoxy equivalent weight of less than about 350, wherein if the epoxy compound is water insoluble it must have a ball and ring softening point of about 40 degrees C. or less;

(ii) an imidazole compound(s) selected from the group consisting of

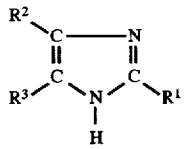

wherein

R$^1$ is independently selected from the group consisting of hydrogen, aryl radicals, alkyl radicals comprising up to about 18 carbon atoms, and cycloalkyl radicals comprising up to about 18 carbon atoms;

R$^2$ is independently selected from the group consisting of hydrogen, aryl radicals, alkyl radicals comprising up to about 18 carbon atoms, and cycloalkyl radicals comprising up to about 18 carbon atoms;

R$^3$ is independently selected from the group consisting of hydrogen, aryl radicals, alkyl radicals comprising up to about 18 carbon atoms, and cycloalkyl radicals comprising up to about 18 carbon atoms;

wherein R$^2$ and R$^3$ may alternatively together form a fused ring structure; and (iii) at least about 5 percent by weight water based on the total weight of components of elements (i) plus (ii) plus (iii);

(B) agitating the mixture and allowing the mixture to react wherein optionally the mixture is heated to accelerate the reaction wherein the amount of heat optionally added in step (B) and the epoxy compound added in step (A) is such that the mixture temperature during reaction does not exceed about 110 degrees C., wherein sufficient water is added in step (A) such that at least about 5 percent by weight water is present based upon the total weight of the mixture during step (B);

(C) optionally adding to the mixture an additional charge of an epoxy compound(s) having at least one vicinal epoxy group per molecule and an epoxy equivalent weight of less than about 350, wherein if the epoxy compound is water insoluble it must have a ball and ring softening point of about 40 degrees C. or less, after cooling the mixture, if necessary, to achieve a temperature range of about 15 to about 50 degrees C. and allowing the mixture to react wherein optionally the mixture is heated to accelerate the reaction, wherein the amount of epoxy compound(s) added in step (C) and the amount of heat optionally added in step (C) is such that the temperature of the mixture of step (C) does not exceed about 110 degrees C., and wherein agitation is maintained throughout step (C);

(D) optionally repeating step (C) one or more times;

(E) continuing agitation of the mixture and cooling, if necessary, to obtain a temperature range of the mixture of about 15 to about 50 degrees C. and adding a final charge of an epoxy compound(s) having at least one vicinal epoxy group per molecule and an epoxy equivalent weight of less than about 350, wherein if the epoxy compound is water insoluble it must have a ball and ring softening point of about 40 degrees C. or less; and (F) heating the mixture to a temperature range of about 120 degrees C. to about 160 degrees C. to cause the mixture to further react and to remove water and form the curing agent composition;

wherein the total amount of epoxy compound(s) and imidazole compound(s) used according to the method is such that about 0.55 to about 1.3 equivalents of secondary amine group of the imidazole compound(s) per equivalents of epoxy group are used;

wherein water is added to the mixture, if necessary, in one or more of the following steps:(C), (D), (E) in order that at least about 5 percent by weight water is present based upon the total weight of the mixture during optional step (C), if included, optional step (D), if included, and step (E);

(b) an epoxy compound(s) having an average of greater than 1 vicinal epoxy group per molecule; and (c) an optional epoxy co-curing agent(s);

wherein about 0.1 to about 20 weight percent of the curing agent composition of (a) is present based on the total weight of the curable composition.

6. The curable composition of claim 5 wherein the epoxy compound is selected from the group consisting of polyglycidyl ethers of a polyhydric phenols are diglycidyl ether of bisphenol A, polyglycidyl ethers of phenolic novolac compounds, glycidylated amino alcohol compounds, triglycidyl isocyanuric acid, hydantoin diepoxides, polyglycidyl ethers of aliphatic polyhydric compounds, polyglycidyl esters of polycarboxylic acids, cyclohexene oxide-containing molecules, and epoxies derived from reaction of peracetic acid with olefinic compounds.

7. The curable composition of claim 5 wherein the epoxy co-curing agent is selected from the group consisting of phenolic compounds, mercaptans, polycarboxylic acids and their anhydrides, amino compounds, amine salts, and quaternary ammonium salts.

8. The cured composition of claim 5.

* * * * *